United States Patent
Park et al.

(10) Patent No.: US 9,332,513 B2
(45) Date of Patent: May 3, 2016

(54) METHOD AND APPARATUS FOR PERFORMING SYNCHRONIZATION IN DEVICE-TO-DEVICE NETWORK

(71) Applicant: Samsung Electronics Co. Ltd., Suwon-si, Gyeonggi-do (KR)

(72) Inventors: Seung-Hoon Park, Seoul (KR); Kyung-Kyu Kim, Seoul (KR); Dae-Gyun Kim, Seongnam-si (KR); Chi-Woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 13/895,846

(22) Filed: May 16, 2013

(65) Prior Publication Data

US 2013/0308625 A1    Nov. 21, 2013

(30) Foreign Application Priority Data

May 16, 2012  (KR) ......................... 10-2012-0052040

(51) Int. Cl.
| | | |
|---|---|---|
| *H04W 56/00* | (2009.01) | |
| *H04W 4/00* | (2009.01) | |
| *H04J 3/06* | (2006.01) | |
| *G06F 1/12* | (2006.01) | |
| *H04B 3/23* | (2006.01) | |

(52) U.S. Cl.
CPC .......... *H04W 56/001* (2013.01); *H04W 56/002* (2013.01); *G06F 1/12* (2013.01); *H04B 3/232* (2013.01); *H04J 3/0602* (2013.01); *H04J 3/0605* (2013.01); *H04W 4/005* (2013.01)

(58) Field of Classification Search
CPC ............. H04W 56/001–56/002; H04W 4/005; H04J 3/0602; H04J 3/0635; H04B 3/232; G06F 1/12
See application file for complete search history.

(56) References Cited

U.S. PATENT DOCUMENTS

| 5,214,381 A | * | 5/1993 | Cory ................. G01R 33/4831 324/307 |
| 6,392,642 B1 | * | 5/2002 | Wu ............................... 345/213 |

(Continued)

FOREIGN PATENT DOCUMENTS

| EP | 1 744 472 A1 | 1/2007 |
| EP | 1 852 998 A1 | 11/2007 |
| EP | 1 936 837 A1 | 6/2008 |

OTHER PUBLICATIONS

Mohamed Ben Hadj Rhouma et al., 'Self-Organization of Pulse-Coupled Oscillators with Application to Clustering', In: IEEE Transactions on Pattern Analysis and Machine Intelligence: IEEE, vol. 23, No. 2, Feb. 2001 See pp. 180-188.

Hichem Frigui et al., 'Clustering Based on Synchronization of Pulse-Coupled Oscillators', In: Fuzzy Information Processing Society, 2000, NAFIPS, 19th International Conference of the North American: IEEE, Jul. 13, 2000 See pp. 128-131.

Yu Niu et al., 'General criteria-based clustering method for sensor network', In: Network Computing and Information Security (NCIS), 2011 International Conference on: IEEE, May 14, 2011 See pp. 282-285.

(Continued)

*Primary Examiner* — Xavier S. Wong

(74) *Attorney, Agent, or Firm* — Jefferson IP Law, LLP

(57) ABSTRACT

A method and an apparatus for performing synchronization by a first device in a Device-to-Device (D2D) network are provided. The method includes detecting a synchronization signal from at least one second device during one period, determining a phase adjustment value depending on a number of synchronization signals, which have been detected from the at least one second device during the one period, adjusting a phase value of a first device using the phase adjustment value, and transmitting a synchronization signal if the phase value of the first device reaches a predetermined specific value.

24 Claims, 15 Drawing Sheets

(56) References Cited

U.S. PATENT DOCUMENTS

| | | | |
|---|---|---|---|
| 6,535,566 B1* | 3/2003 | Tamamura et al. | 375/371 |
| 2006/0018344 A1* | 1/2006 | Pamarti | H04L 5/06 370/480 |
| 2010/0182980 A1* | 7/2010 | Jobert | H04J 3/0667 370/336 |
| 2012/0063447 A1* | 3/2012 | Tyrrell et al. | 370/350 |
| 2012/0093098 A1* | 4/2012 | Charbit et al. | 370/329 |

OTHER PUBLICATIONS

Alexander Tyrrel et al., 'Firefly Synchronization in Ad Hoc Networks', In: 3rd MiNEMA Workshop, Leuven, Belgium, Feb. 7, 2006 See pp. 1-4.

Self-Organised Network Synchronisation, NTT DoCoMo, IST-4-027756 Winner II, Nov. 30, 2007, pp. 97-106, D2.3.3-v1.00.

\* cited by examiner

Normal PCO
▶ CF : 0.01

Boost PCO
▶ CF : 0.01 → 0.03

Boost PCO
▶ CF : 0.01 → 0.05

Y axis : firing time [ms]
X axis : simulation time/osc period

METHOD AND APPARATUS FOR PERFORMING SYNCHRONIZATION IN DEVICE-TO-DEVICE NETWORK

PRIORITY

This application claims the benefit under 35 U.S.C. §119 (a) of a Korean patent application filed on May 16, 2012 in the Korean Intellectual Property Office and assigned Serial No. 10-2012-0052040, the entire disclosure of which is hereby incorporated by reference.

BACKGROUND OF THE INVENTION

1. Field of the Invention

The present invention relates to a Device-to-Device (D2D) network. More particularly, the present invention relates to a method and apparatus for performing synchronization in a D2D network.

2. Description of the Related Art

In recent years, data traffic has been dramatically increasing due to the prevalence of mobile devices such as smart phones. A report of the Korea Communications Commission (KCC) shows that mobile data traffic has increased three times over the past year due to the accelerating prevalence of mobile devices. In the future, the number of users of the mobile devices will further increase and the application services running in the mobile devices will be more prevalent, so the data traffic is expected to increase much more. In particular, if Machine-to-Machine (M2M) communication utilizing machines, such as communication between people and machine, and communication between machines, which is a new mobile market, is prevalent beyond the communication between people, the traffic transmitted to an evolved Node B (eNB) or Base Station (BS) is expected to surge.

Therefore, technology capable of solving these problems is required. Recently, Device-to-Device (D2D) direct communication technology has attracted a lot of attention. This technology, called 'D2D communication', has attracted attention in both licensed bands of mobile communication and non-licensed bands of, for example, Wireless Local Area Network (WLAN).

D2D communication is noteworthy in that if converged in mobile communication, the D2D communication can increase the traffic capacity of the eNB and reduce the overload of the eNB. In other words, if User Equipments (UEs) or Mobile Stations (MSs) in the same cell or cells adjacent to each other directly exchange data over a D2D link without passing through an eNB after setting up the D2D link between the UEs, the number of links may be reduced from 2 to 1, contributing to the resource efficiency.

Research on the non-licensed bands aims to prevent the unnecessary waste of wireless resources by recognizing the requests for communication between people, communication between people and machine, and communication between machines, and to appropriately provide a service by determining the traffic that occurs locally. Therefore, the research is focused on a method of efficiently operating a process of broadcasting information about service and content to the surroundings and receiving the service and content by a plurality of devices.

In order to perform a method of controlling communication between devices, a process of setting up synchronization between devices is required. Setting up synchronization between devices using time information received via a synchronous eNB or a Global Positioning System (GPS) receiver module can be considered. According to this method of setting up the synchronization between devices, by a device, synchronization using time information received via a synchronous eNB or a GPS receiver module, the device is required to access the synchronous eNB or the GPS receiver module. However, in a certain communication scheme provided by communication operators, the device may not support the synchronous eNB, so it may not set up synchronization using the time information received via the synchronous eNB. In addition, if the device is located in a GPS shadow area (for example, an area between the skyscrapers, a tunnel area, an interior of a building, and the like), the device may not set up its synchronization since it cannot receive time information from the GPS. As such, the device may not even initiate the D2D communication, if its access to the synchronous eNB or GPS receiver module is not smooth. Besides, some devices may have a high-battery consumption problem, since they consume a lot of power when equipped with a GPS receiver module.

Setting up synchronization between devices without the help of an apparatus that transmits reference time information, such as the GPS and the synchronous eNB, refers to matching the reference times of the devices. Each device has an oscillator, and sets its reference time based on the oscillation frequency of the oscillator. In order to efficiently exchange control signals and data signals with each other in a D2D communication link without collision, all devices need to operate in the same frame structure as they have the same reference time.

However, in the initial phase, the devices may have different reference times since the devices drive their oscillator at different times. For example, on the assumption that a value of an oscillator repeatedly increases from 0 to 100, if a device A started its oscillator at an absolute time of 10 and a device B started its oscillator at an absolute time of 40, then the device A has an oscillator value of 40 and the device B has an oscillator value of 10 at an absolute time of 50.

Therefore, in the existing network, the D2D synchronization method allows the devices to share a difference or offset between the oscillator values to adjust their reference time. In the foregoing example, at the absolute time of 50, the device A informs the device B of its oscillator value of 40, and in response, the device B informs the device A that an offset between the oscillator value '40' of the device A and the oscillator value '10' of the device B is 30. Based on the offset information, the device A corrects its oscillator value, thereby matching the synchronization between the device A and the device B.

However, if the number of devices increases, it is difficult to converge the network within a predetermined time by merely repeatedly performing this point-to-point operation. Therefore, several methods have been devised, such as a method of selecting a representative device and operating based on its reference time, and a method of repeatedly performing a point-to-multipoint operation.

The conventional technology is limited to the method in which devices exchange their time information with each other, since it is difficult to support the scalable network with the method of selecting the representative device. Basically, the devices exchange information about an offset in reference time between the devices using a Media Access Control (MAC) message, to match synchronization. In this case, the device performances may degrade due to different types of latencies which occur in a process of encoding a MAC message during transmission and decoding the MAC message during reception. These latencies include encoding latency, propagation latency, decoding latency, processing latency, channel accessing latency, and the like. In particular, when the resource access is performed on a contention basis, the channel accessing latency caused by the collision may be serious. Therefore, in the conventional technology, as the network grows, the complexity of a synchronization method (for example, a method of selecting and managing a representative device) may be higher and the latency may be longer. In a dynamic D2D network in a wide area, the convergence of the synchronization may take a long time.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for performing synchronization using a synchronization signal of a physical layer in a Device-to-Device (D2D) network.

Another aspect of the present invention is to provide a method and apparatus for performing synchronization using a Pulse-Coupled Oscillator (PCO) algorithm in a D2D network.

In accordance with an aspect of the present invention, a method for performing synchronization by a first device in a Device-to-Device (D2D) network is provided. The method includes detecting a synchronization signal from at least one second device during one period, determining a phase adjustment value depending on a number of synchronization signals, which have been detected from the at least one second device during the one period, adjusting a phase value of a first device using the phase adjustment value, and transmitting a synchronization signal if the phase value of the first device reaches a predetermined specific value.

In accordance with another aspect of the present invention, an apparatus for performing synchronization by a first device in a Device-to-Device (D2D) network is provided. The apparatus includes a receiver for detecting a synchronization signal from at least one second device during one period, and a controller for determining a phase adjustment value depending on a number of synchronization signals, which have been detected from the at least one second device during the one period, for adjusting a phase value of a first device using the phase adjustment value, and for controlling a transmitter to transmit a synchronization signal if the phase value of the first device reaches a predetermined specific value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Aspects of the present invention do not consider the synchronization method that uses a Media Access Control (MAC) message, but a new method in which a physical layer transmits a synchronization signal, preventing the latency which may occur while a device passes through a MAC layer. It is assumed that the synchronization signal transmitted by the physical layer is in the form of a preamble, a code and a sequence, and is designed to be recovered to some extent even though the synchronization signals overlap each other.

A process may be considered in which a synchronization signal of the physical layer is transmitted upon occurrence of a specific event set by a device, and upon receiving the synchronization signal, another device adjusts its reference time. In this way, synchronization may be achieved (i.e., the reference times may be matched) within a predetermined time as the devices mutually repeatedly perform the above operations. The device has limits in sending information used in the MAC layer, such as device ID and time offset information, in the synchronization signal transmitted by the physical layer. Therefore, each device should use only its reference time-related information that it has at the time the synchronization signal is received.

As a way to achieve synchronization even in these limited conditions, a Pulse-Coupled Oscillator (PCO) algorithm has been proposed. A common PCO algorithm will be described below with reference to FIGS. 1 to 5.

Figure 1:
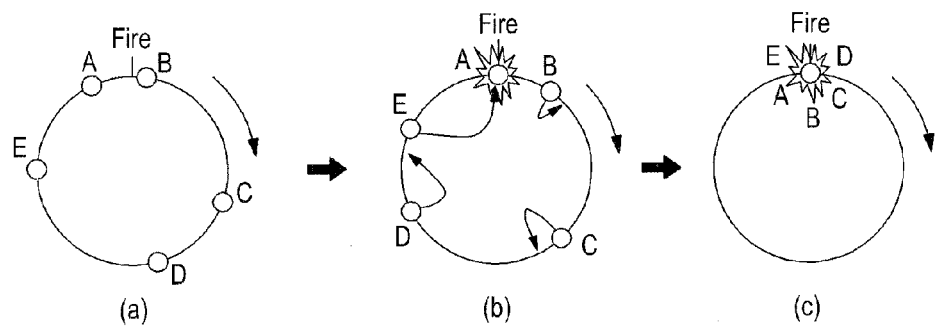
FIG. 1 illustrates a method for performing Device-to-Device (D2D) synchronization using a Pulse-Coupled Oscillator (PCO) algorithm according to an exemplary embodiment of the present invention.

FIG. 1 illustrates a method for performing Device-to-Device (D2D) synchronization using a PCO algorithm according to an exemplary embodiment of the present invention. An operation of the PCO algorithm is roughly divided into a firing operation and a listening operation.

Referring to FIG. 1, devices A to E each have their own oscillator having the same phase growth rate. Each of the devices perform firing when their phases reach the maximum value or peak value (i.e., when the phase returns back to its initial position on the circle). If there is no interconnectivity between the devices in the state (a) of FIG. 1, each device performs firing at intervals of a period T that is determined based on the phase growth rate and the maximum phase value. When the device A transmits a synchronization signal at a firing point of time and other devices receive the synchronization signal, they can readjust their phase value as in state (b) of FIG. 1.

In accordance with this PCO algorithm, in state (b) of FIG. 1, the other devices B, C, D and E except for the device A that has performed firing, each may determine a readjustment value as a function of its phase value. For example, in terms of the time, the device B has performed firing just a little while ago, while the device E has performed firing a long time ago. Therefore, the device E is greater than the device B in terms of the phase readjustment value. If the phase value of the device E reaches its maximum value as it is readjusted to increase, the device E performs firing at the time that its phase value reached the maximum value, and then returns the phase to zero (0). If the operation of state (b) is repeated a predetermined number of times or more, oscillators of all devices may have the same phase value as in state (c) of FIG. 1, achieving synchronization of the network.

Figure 2:
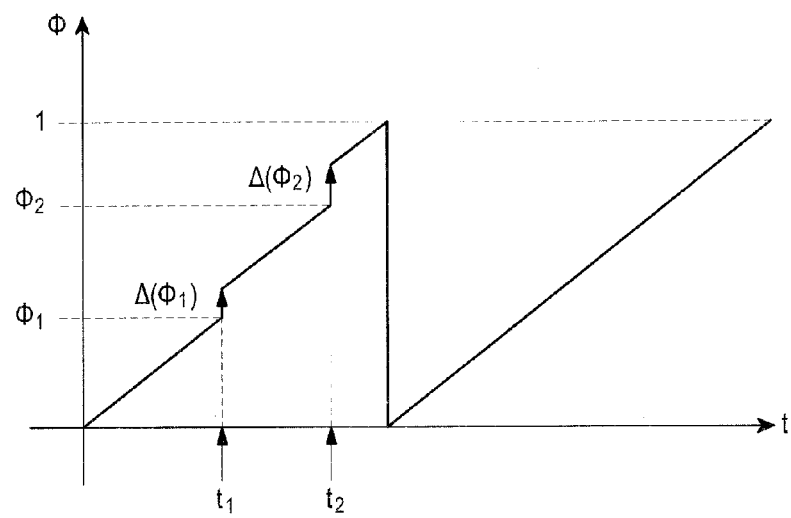
FIG. 2 illustrates a temporal flow of a phase that varies depending on the phase readjustment value upon receiving a synchronization signal from another device according to an exemplary embodiment of the present invention.

FIG. 2 illustrates a temporal flow of a phase that varies depending on the phase readjustment value upon receiving a synchronization signal from another device according to an exemplary embodiment of the present invention.

Referring to FIG. 2, shown is a temporal flow of a phase that varies depending on the readjustment value $\Delta(\phi_1)$ and $\Delta(\phi_2)$ determined by the given phase values $\phi_1$ and $\phi_2$ when a synchronization signal is received from another device at time $t_1$ and time $t_2$.

Figure 3:
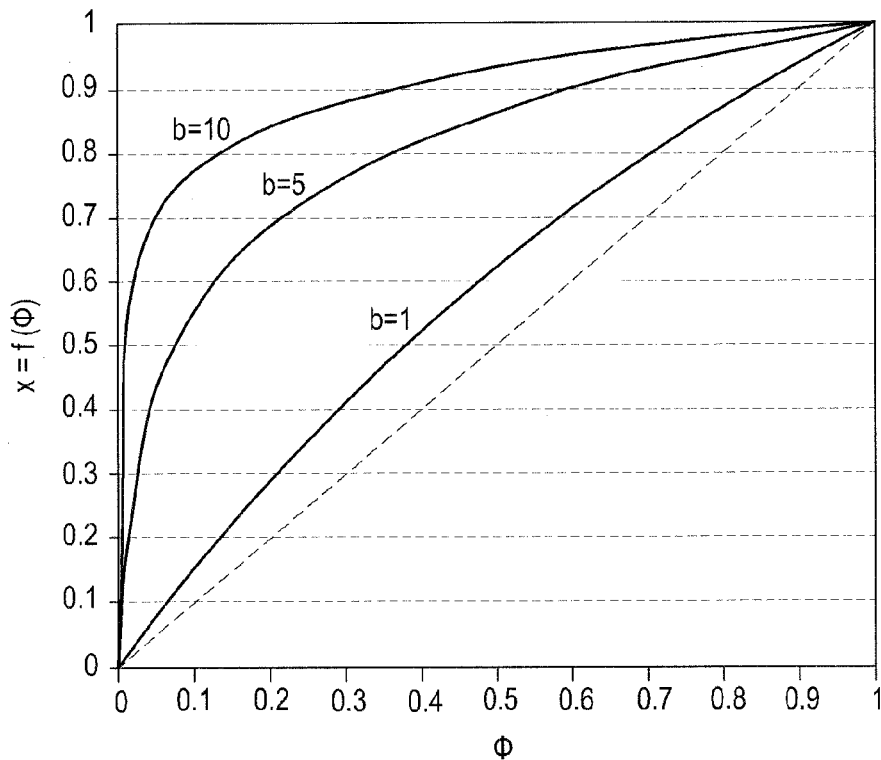
FIG. 3 illustrates curves determined depending on the phase readjustment values according to an exemplary embodiment of the present invention.

FIG. 3 illustrates curves determined depending on the phase readjustment values according to an exemplary embodiment of the present invention.

The phase readjustment values are determined by a function $f(\phi)$ that is expressed as a curve of FIG. 3, and the function $f(\phi)$ can be defined as Equation (1) below.

$$f(\phi) = \frac{1}{b} \cdot \ln(1 + [e^b - 1] \cdot \phi) \quad \text{with } b > 0 \tag{1}$$

In Equation (1), b denotes the degree of curvature. Referring to FIG. 3, as a value of b is greater, the curvature is higher.

The phase value newly determined by phase readjustment may be expressed as Equation (2) below.

$$\phi_{new} = g(\phi) = \min(1, f^{-1}(f(\phi) + \epsilon)) \tag{2}$$

In Equation (2), a value of $\epsilon$ indicates the degree at which devices are connected to each other. In other words, mathematically, the value of $\epsilon$ indicates the strength at which the devices respond to the firing in the curves of FIG. 3.

Figure 4:
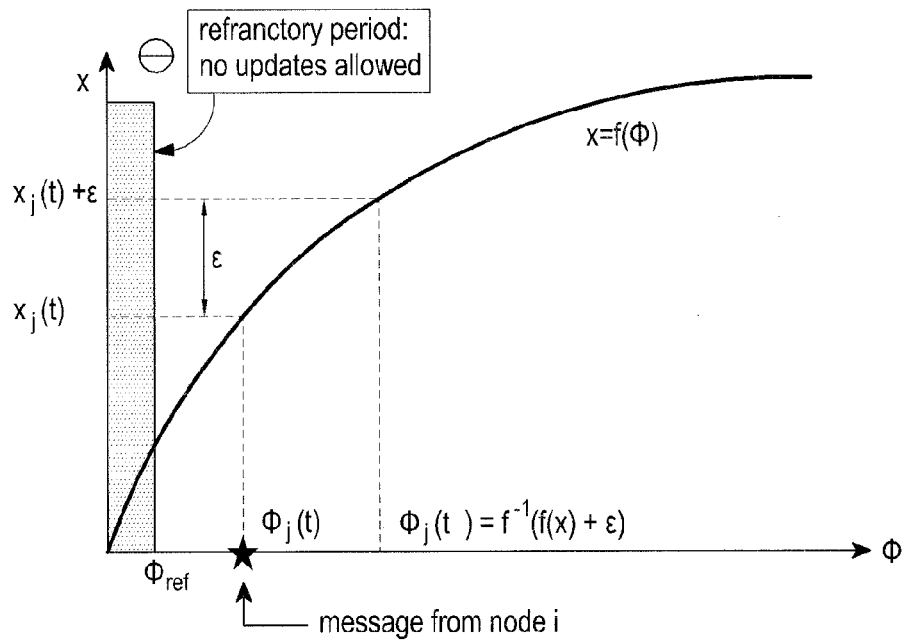
FIG. 4 illustrates a curve determined depending on an offset between phase values upon reception of a synchronization signal according to an exemplary embodiment of the present invention.

FIG. 4 illustrates a curve determined depending on an offset between phase values upon reception of a synchronization signal according to an exemplary embodiment of the present invention.

In the graph of FIG. 4, it is assumed that a device #j has received a synchronization signal from a device #i at time t, and a phase value at that time is $\Phi_j(t)$. An output value $f^{-1}(f(\Phi_j(t)) + \epsilon)$ determined by adding $\epsilon$ to an output value $f(\Phi_j(t))$ of a function $f(\Phi(t))$ that uses $\Phi_j(t)$ as an input, and using the addition results as an input of an inverse function $f^{-1}(\Phi)$, is a target phase value. From this process, it can be appreciated that if a phase value, which given when a synchronization signal is received, is small, an offset between the given phase value and the target phase value is small, and if a phase value, which given when a synchronization signal is received, is large, an offset between the given phase value and the target phase value is large.

Figure 5:
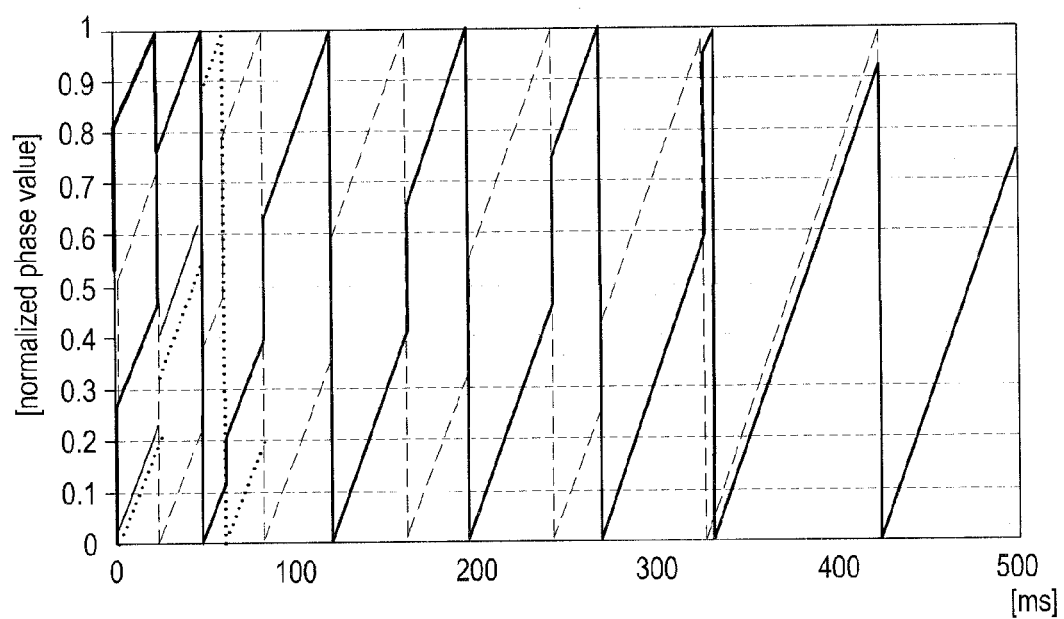
FIG. 5 illustrates an operation of converging phase values of devices according to an exemplary embodiment of the present invention.

FIG. 5 illustrates an operation of converging phase values of devices according to an exemplary embodiment of the present invention. The graph of FIG. 5 shows an operation of converging phase values of 10 devices each having a phase growth rate of 1/100[ms].

However, the above-described PCO algorithm may not be applied intact, because aspects of the present invention aim at synchronization in the D2D network. As for the D2D network in consideration, a device accesses the D2D network to form a link, only if the device needs to do so after analyzing the service-related information broadcasted by an adjacent device. In order to efficiently perform this process, it is preferable, but not necessary, for adjacent devices to exchange service information with each other during a specific period of time, instead of broadcasting it any time without reference time. Therefore, the required processes may be configured in a predetermined frame structure as illustrated in FIGS. 6 and 7.

Figure 6:
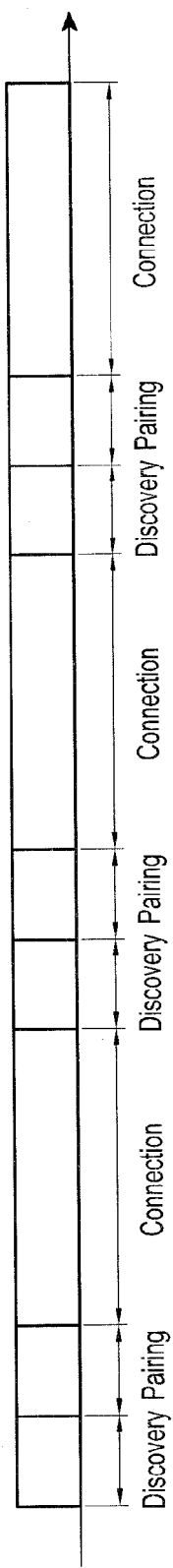
FIGS. 6 and 7 illustrate a communication procedure in a D2D network according to an exemplary embodiment of the present invention.
Figure 7:
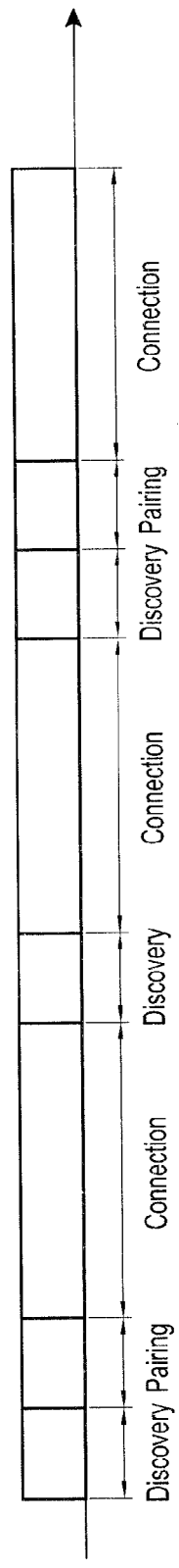
Figure 8A:
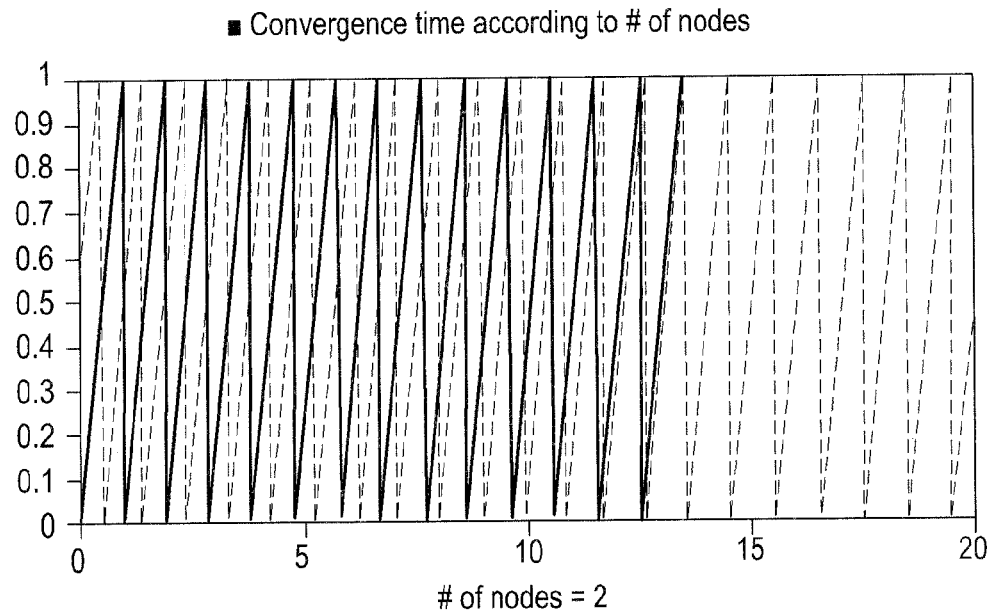
FIGS. 8A to 8D illustrate a convergence speed determined depending on the number of devices performing a PCO algorithm according to an exemplary embodiment of the present invention.
Figure 8B:
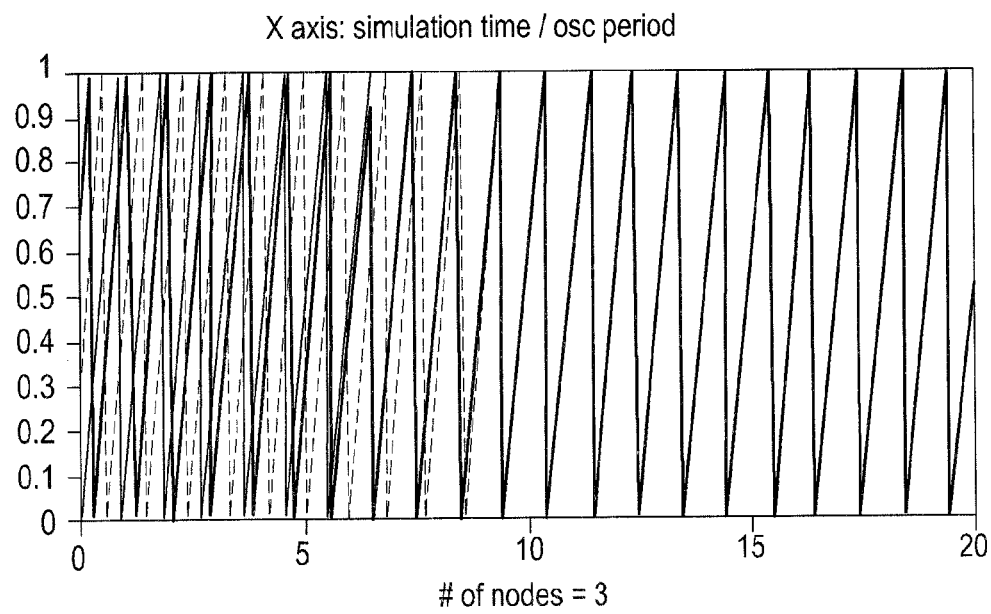
Figure 8C:
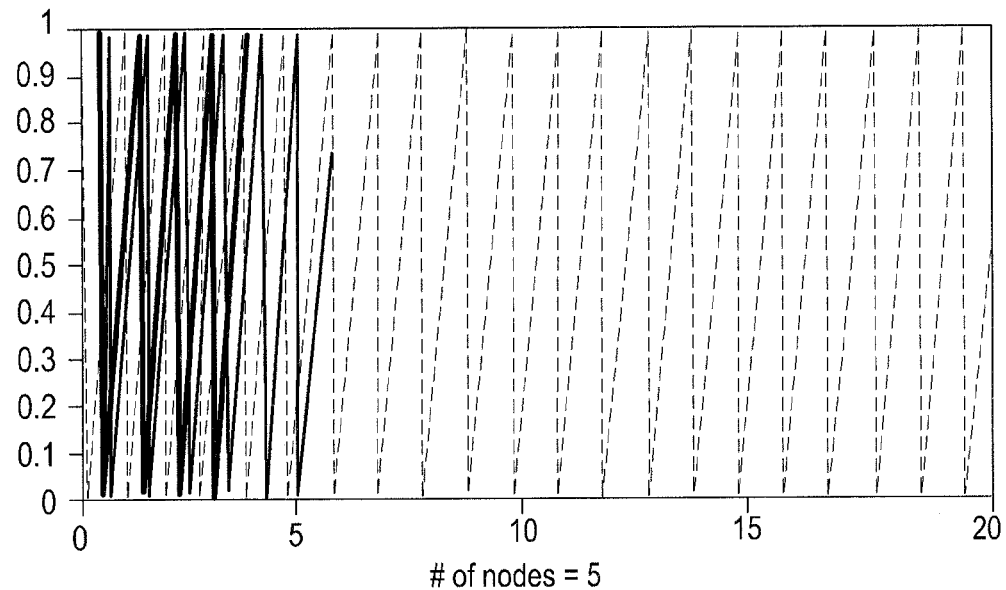
Figure 8D:
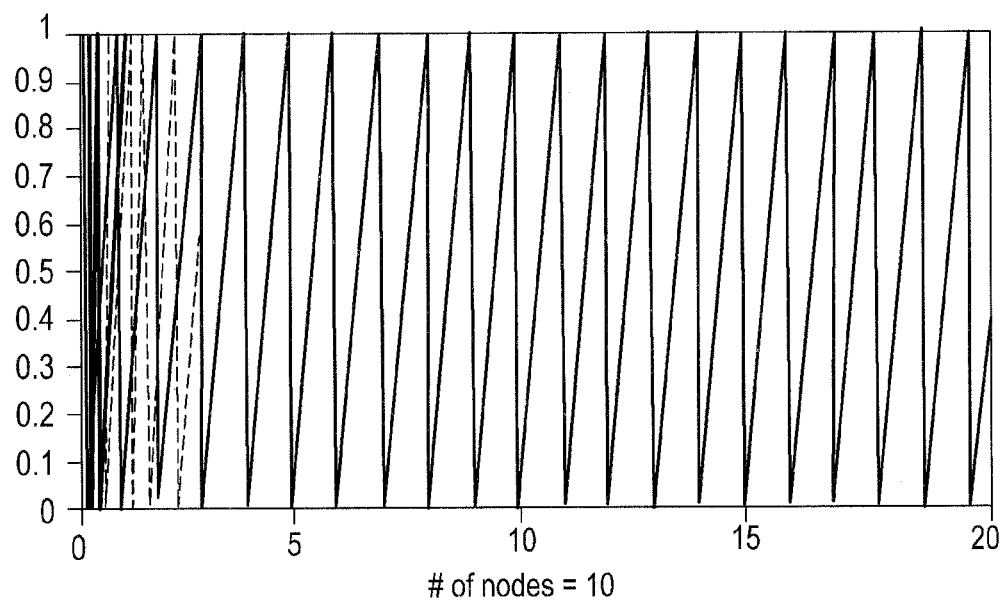

FIGS. 6 and 7 illustrate a communication procedure in a D2D network, to which an exemplary embodiment of the present invention is applied.

Referring to FIGS. 6 and 7, the communication procedure in the D2D network includes a discovery process, a pairing process, and a connection process.

In the discovery process, adjacent devices exchange service-related information with each other. In the pairing process, a device selects the device that transmitted specific information in the discovery process, sends its intention to form a link as a pair, and determines whether to perform pairing, depending on a response from the receiving device. In the connection process, the devices, which are paired in the pairing process, exchange data with each other.

Because the pairing process may include a function of managing the formed link, a plurality of pairing intervals may fall within a period of one discovery interval as illustrated in FIG. 7.

In the conventional Ad-hoc network, contention-based resource access is commonly used without network synchronization. Even if the network synchronization is matched, the synchronization is performed only between the devices connected to the network (i.e., the devices that passed the connection process), and the contention-based resource access is used before the connection process is achieved. For example, 802.15.4 ZigBee defines a Contention Access Period (CAP) and a Guaranteed Time Slot (GTS), and 802.11 Wireless-Fidelity (Wi-Fi) basically uses Carrier Sense Multiple Access/Collision Avoidance (CSMA/CA), which is contention-based resource access. However, devices may use non-contention-based resource access such as polling in addition to CSMA/CA after accessing an Access Point (AP) using a broadcast message (i.e., beacon or probe).

However, in the D2D network according to an aspect of the present invention, synchronization is achieved even for the discovery process and the pairing process, which are unconnected processes before the connection process is performed. As a result, adjacent devices may use the discovery process and the pairing process in the same time zone based on the common frame structure. The important thing in synchronization is the time it takes to perform synchronization, and the aspects of the present invention consider minimizing the synchronization time by performing an adaptive operation according to the circumstances to improve the shortcomings of the PCO algorithm.

FIGS. 8A to 8D illustrate a convergence speed determined depending on the number of devices performing a PCO algorithm according to an exemplary embodiment of the present invention.

In FIGS. 8A to 8D, the number of devices is represented by # of nodes. It can be understood that as the number of devices performing the PCO algorithm is increased, the convergence speed is higher, because the time, at which a synchronization signal is transmitted in the PCO algorithm, gradually gets ahead by the interaction.

Figure 9A:
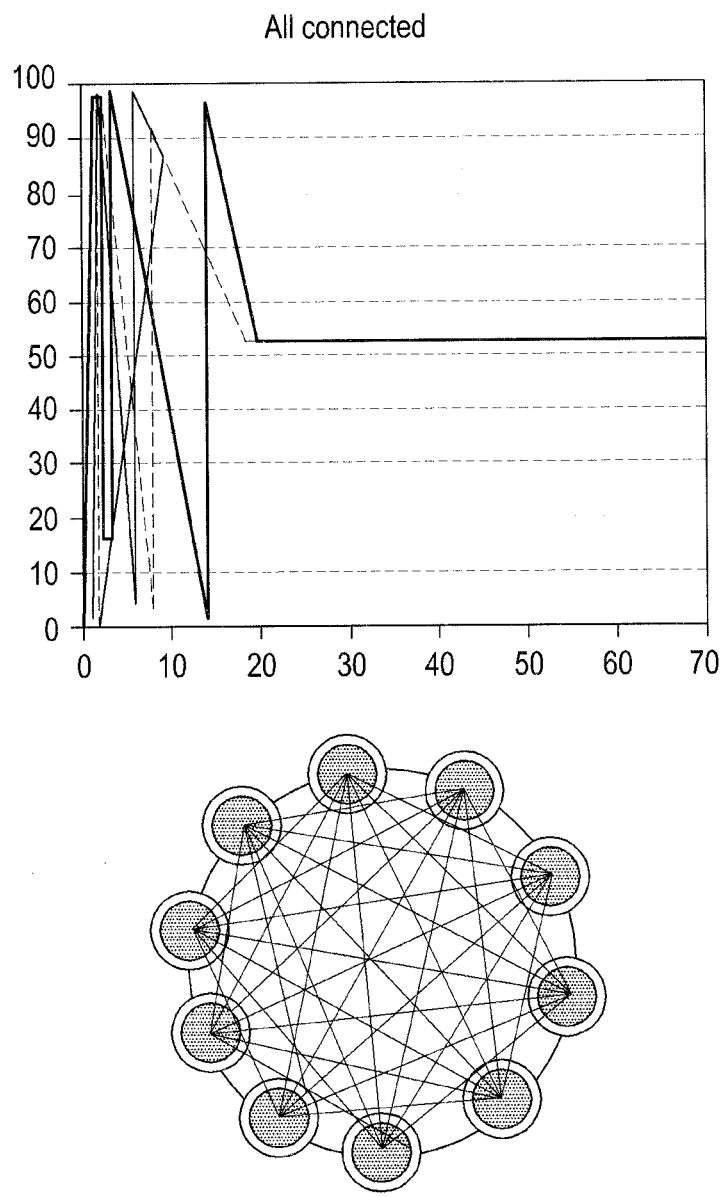
FIGS. 9A to 9C illustrate a convergence speed in a PCO algorithm, which is determined depending on the topology according to an exemplary embodiment of the present invention.
Figure 9B:
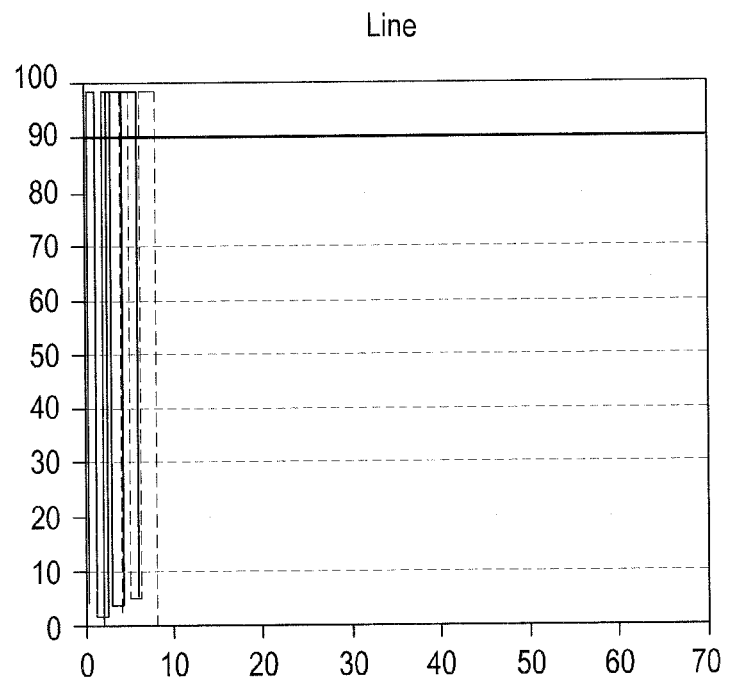
Figure 9B:
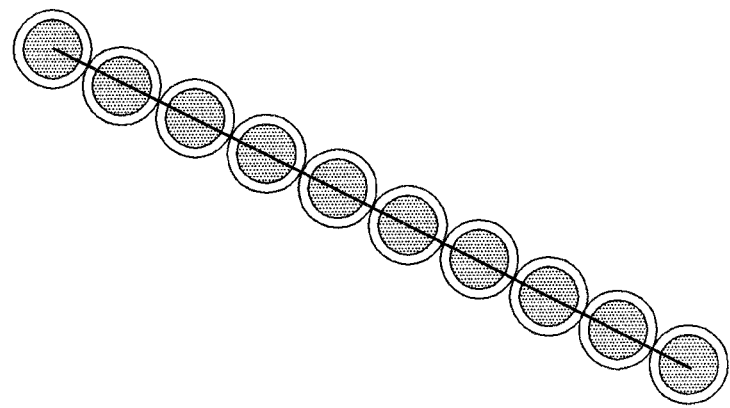
Figure 9C:
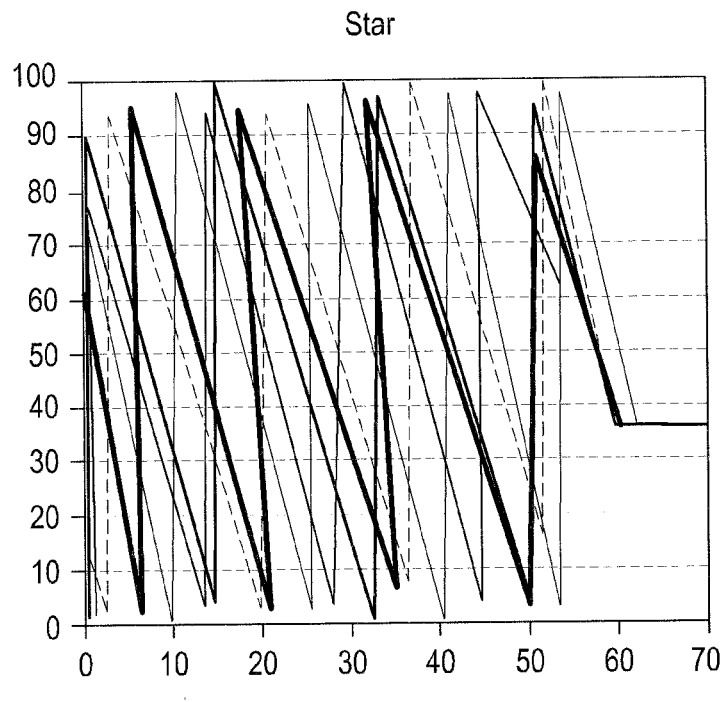
Figure 9C:
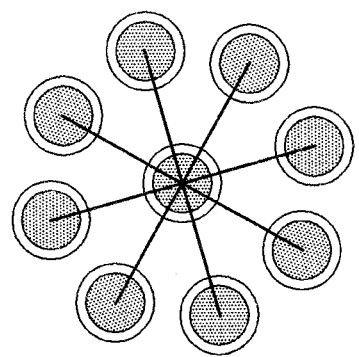

FIGS. 9A to 9C illustrate a convergence speed in a PCO algorithm, which is determined depending on the topology according to an exemplary embodiment of the present invention.

The PCO algorithm needs an adaptive method for meeting the requirements at all times since the synchronization convergence speed varies depending on the circumstances as illustrated in FIGS. 9A to 9C.

In addition, aspects of the present invention aim to extend the adaptive synchronization method by taking into consideration the method of forming a frame structure that has a plurality of steps of using a synchronization signal, i.e., has not only the step of transmitting a first synchronization signal before the discovery process, but also the step of transmitting a second synchronization signal even in the connection process.

In the aspects of the present invention, attention is paid to the properties of a value of a coupling factor $\epsilon$ in the original PCO algorithm. If a value of the coupling factor $\epsilon$ is small, the PCO synchronization convergence speed is low. On the contrary, if a value of the coupling factor $\epsilon$ is large, the synchronization convergence speed is high. If an extremely large value of the coupling factor $\epsilon$ is used, it can be considered that upon receiving a synchronization signal, the device matches its synchronization to the time that the synchronization signal is transmitted. In this case, synchronization is likely to be matched to partially different times in the scalable network, so a moderately small value of the coupling factor $\epsilon$ needs to be selected. However, if the value of the coupling factor $\epsilon$ is small, the synchronization convergence speed is low, making it difficult to guarantee the fast discovery service that the aspects of the present invention aim to provide.

Therefore, the aspects of the present invention provide a method of varying a value of the coupling factor $\epsilon$ from the minimum value to the maximum value depending on the situation. In particular, a method of varying (for example, boosting) a value of the coupling factor $\epsilon$ depending on the number of adjacent devices that transmit a synchronization signal is provided.

A value of the coupling factor $\epsilon$ may be determined by Equation (3) below.

$$\epsilon = \epsilon_{min} + (\epsilon_{max} - \epsilon_{min})/(N_{firings}+1) \qquad (3)$$

In Equation (3), $\epsilon_{min}$ denotes the minimum possible value of the coupling factor $\epsilon$, $\epsilon_{max}$ denotes the maximum possible value of the coupling factor $\epsilon$, and $N_{firings}$ denotes the number of synchronization signals detected during one period, and is reflected when a device adjusts its phase value by receiving a synchronization signal after this firing. In an exemplary embodiment of the present invention, the one period may be defined as a period in which one firing occurs (for example, a period between the previous firing and the current firing). Alternatively, the one period may be defined as a period from the time that a first device transmitted the previous synchronization signal, until the time that the first device transmits the current synchronization signal. However, this is merely an example and other periods may be defined.

Referring to FIG. 2, while increasing its phase value at a predetermined growth rate beginning from the first firing point of time (with t=0), a device up-adjusts or increases the phase value at time t1 and time t2 to perform the second firing earlier than the predetermined original period T. In this way, as the device receives another firing, one period may be shorter than T. This indicates that one period can vary, which is defined as a period from the time that a first device transmitted the previous synchronization signal, until the time that the first device transmits the current synchronization signal. As can be understood from the following description, this one period represents a period that can vary depending on the number of synchronization signals detected from a second device beginning from the time the first device transmitted the pervious synchronization signal, until the first device transmits the current synchronization signal. The effects by the method of varying a value of the coupling factor $\epsilon$ in accordance with Equation (3) may be shown as illustrated in FIGS. 10A to 10C, in the 'all connected' case where all devices exchange synchronization signals with each other.

Figure 10A:
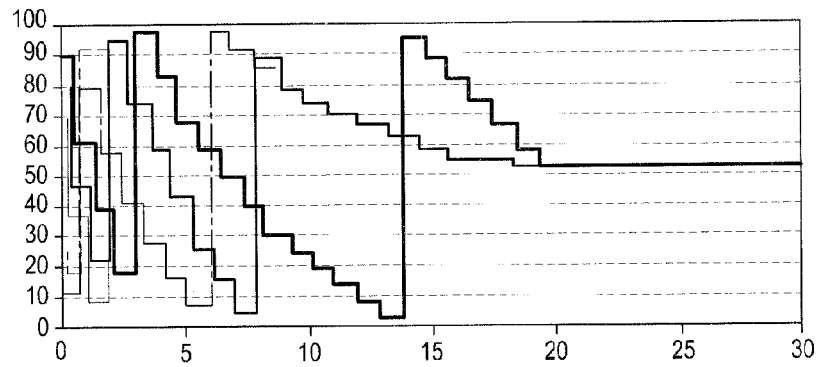
FIGS. 10A to 10C illustrate a convergence speed in a PCO algorithm based on a method of varying a value of the coupling factor $\epsilon$ according to an exemplary embodiment of the present invention.
Figure 10B:
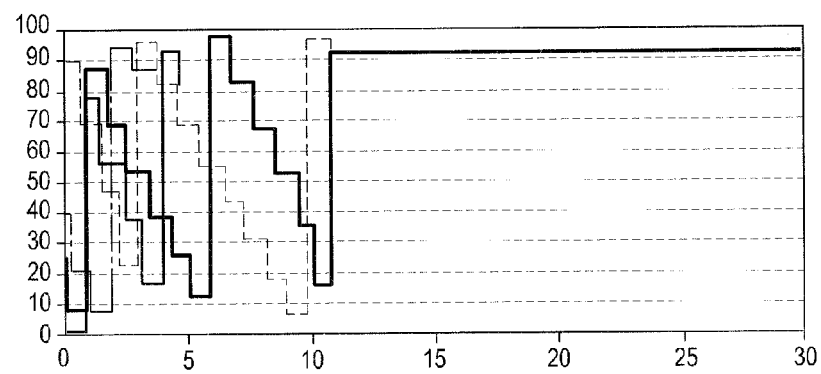
Figure 10C:
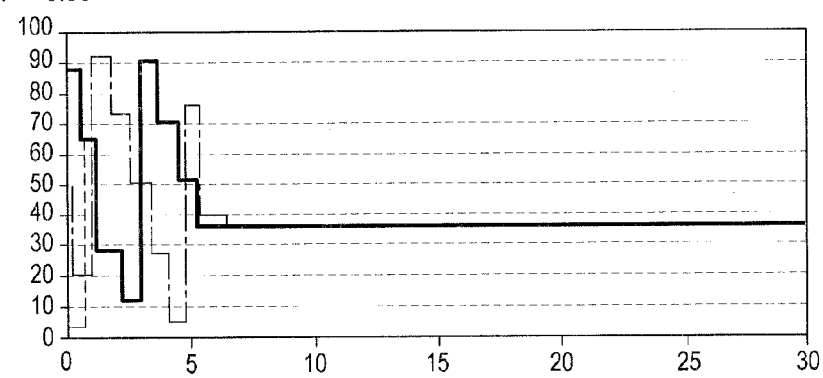

FIGS. 10A to 10C illustrate a convergence speed in a PCO algorithm based on a method of varying a value of the coupling factor $\epsilon$ according to an exemplary embodiment of the present invention.

Referring to FIGS. 10A to 10C, convergence performances are shown for different Coupling Factors (CF) $\epsilon$: $\epsilon_{min}$=0.01, $\epsilon_{max}$=0.03, and $\epsilon_{max}$=0.05. It can be seen that the synchronization is converged at the time that is 20 times the basic period (FIG. 10A), if the coupling factor does not vary, whereas the synchronization is converged at the time that is 12 times the basic period (FIG. 10B), if the coupling factor is 0.03, and 7 times the basic period (FIG. 10C), if the coupling factor is 0.05.

If the boosting method is applied, relatively consistent convergence time may be obtained, for diversification of the convergence time due to different topologies.

FIGS. 11A to 11C and 12 illustrate a convergence speed in a PCO algorithm based on a method of varying a value of the coupling factor $\epsilon$ according to an exemplary embodiment of the present invention.

Figure 11A:
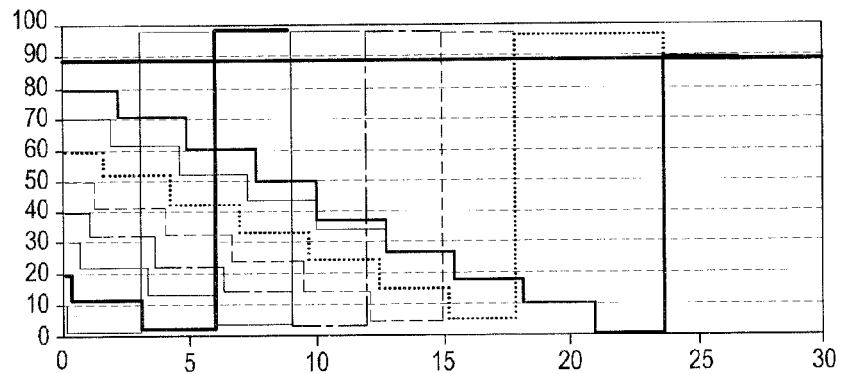
FIGS. 11A to 11C and 12 illustrate a convergence speed in a PCO algorithm based on a method of varying a value of the coupling factor $\epsilon$ according to an exemplary embodiment of the present invention.
Figure 11B:
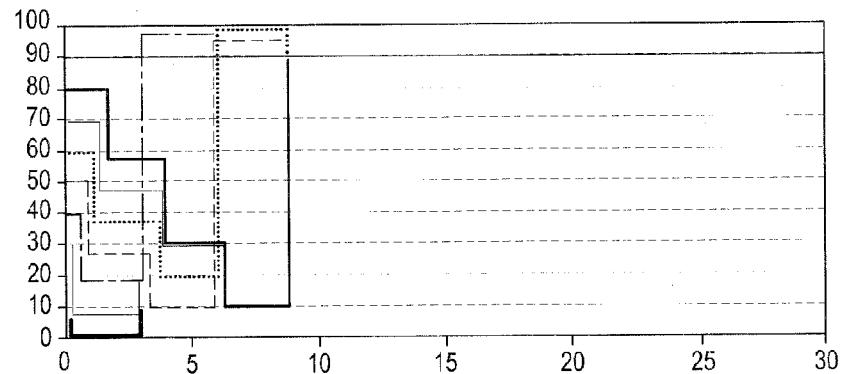
Figure 11C:
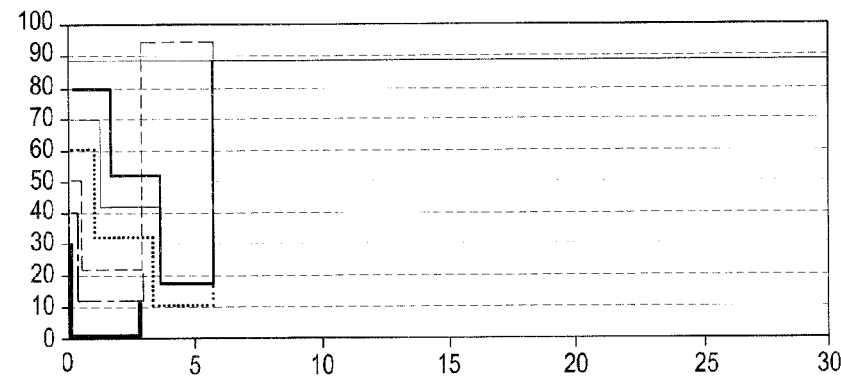
Figure 12:
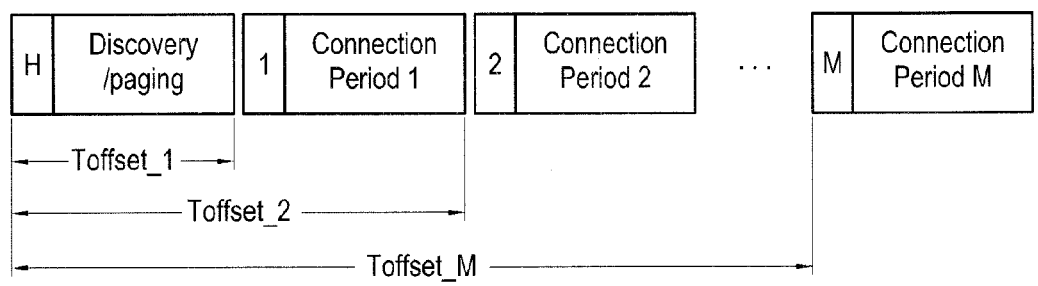

FIGS. 11A to 11C illustrate the boosting effects in a line topology, and FIG. 12 illustrates the boosting effects in a start topology according to an exemplary embodiment of the present invention. Referring to FIGS. 11A to 11C and 12, it is shown that the synchronization performance is converged at the time twice or 7 times the phase period even in the line topology and the start topology.

In addition, aspects of the present invention consider modifying Equation (3) in order to support a plurality of frame structures, for different types of synchronization signals.

There are a total of M types of synchronization signals, a device changes its group depending on the operating status, and switches to a synchronization signal corresponding to the group. A device in a specific state may detect all types of synchronization signals. For example, if a plurality of synchronized devices in one group are adjacent to each other, they need to operate with the maximum coupling factor as they are actually recognized as one group having a different reference time. However, if a plurality types of synchronization signals are not distinguished, it may be considered that as many synchronization signals as M times are received. In order to distinguish the types of synchronization signals, a method needs to calculate the phase offset with the memory left unchanged, considering the case where the phase offset is constant. However, a significant amount of the memory is consumed depending on how finely the phase offset will be calculated, and the complex computation needs to be performed.

Therefore, for a simple exemplary operation, the number of synchronization signals for each distinguishable group are counted, and a value of the coupling factor $\epsilon$ in accordance with Equation (4) below on the basis of the number of synchronization signals in a group, whose coupling factor has the maximum value, is determined.

$$\varepsilon = \varepsilon_{min} + (\varepsilon_{max} - \varepsilon_{min}) / \max_{m \in M}\{(N_{firings,m}+1)\} \quad (4)$$

In Equation (4), $\epsilon_{min}$ denotes the minimum possible value of the coupling factor $\epsilon$, $\epsilon_{max}$ denotes the maximum possible value of the coupling factor $\epsilon$, denotes the number of detected synchronization signals for an m-th group, and M denotes the number of groups.

If a value of the coupling factor $\epsilon$ is determined in the way of Equation (4), the coupling factor $\epsilon$ may be calculated to be close to the number of multiple synchronized groups at high probability as illustrated in FIG. 12, even in a case where a plurality of synchronized groups are adjacent to each other, or even in a case where the number of UEs is different for each type of synchronization signals. FIG. 12 shows a frame structure having multiple types of synchronization signals according to an exemplary embodiment of the present invention.

A description will now be made of a method and apparatus for performing synchronization by readjusting a phase value of a PCO algorithm in a D2D network as described above.

Figure 13:
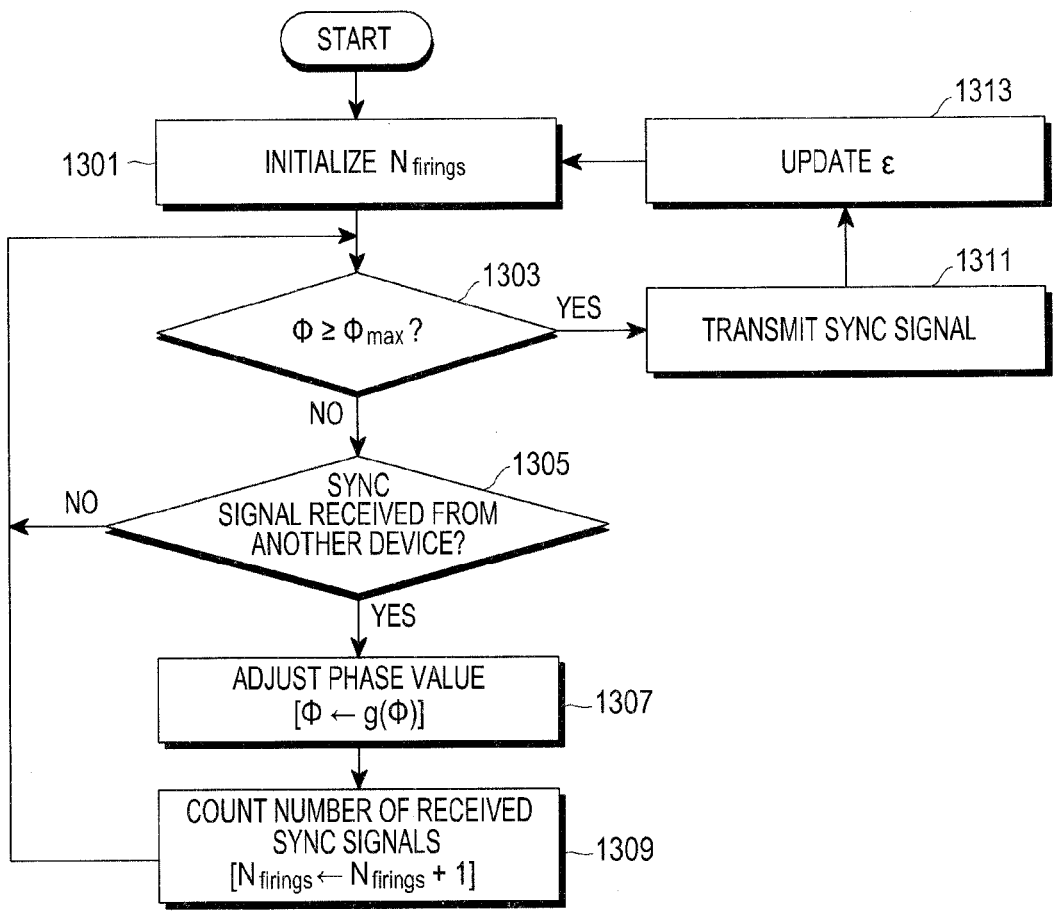
FIG. 13 illustrates a synchronization process in a D2D network according to an exemplary embodiment of the present invention.

FIG. 13 illustrates a synchronization process in a D2D network according to an exemplary embodiment of the present invention. In the synchronization process of FIG. 13, a first device transmits a synchronization signal during one period as in Equation (3).

Referring to FIG. 13, in step 1301, the first device initializes the number of synchronization signals received from at least one other device, or the number $N_{firings}$ of detected synchronization signals. In step 1303, the first device determines whether the current phase value is greater than or equal to the maximum phase value. If the current phase value is less than the maximum value, the first device proceeds to step 1305. On the contrary, if the current phase value is greater than or equal to the maximum phase value, the first device transmits a synchronization signal in step 1311. The 'maximum value' as used herein may refer to a phase value at the point of time that the first device performs firing.

In step 1305, the first device determines whether a synchronization signal is received from at least one other device. Upon detecting a synchronization signal transmitted from at least one other device, the first device proceeds to step 1307. Upon failure to detect a synchronization signal transmitted from at least one other device, the first device returns to step 1303.

In step 1307, the first device adjusts its phase value using Equation (5) below. In step 1309, the first device counts the number of synchronization signals detected from other devices, and then returns to step 1303.

$$g(\Phi) = f^{-1}(f(\Phi(t)) + \epsilon) \quad (5)$$

In Equation (5), $g(\Phi)$ denotes a result of phase value adjusted by a function, $\epsilon$ denotes a coupling factor value that is determined in a previous period, $f$ denotes a predetermined function, and $\Phi(t)$ denotes a phase value when the first device detects the synchronization signals. If the adjusted phase value at step 1307 is greater than or equal to the maximum value in step 1303, the first device transmits a synchronization signal in step 1311, so the phase value is initialized to its original value of zero (0). After transmitting the synchronization signal, the first device determines or updates a value of the coupling factor $\epsilon$ depending on the number $N_{firings}$ of synchronization signals received up to the present (or the number of synchronization signals detected up to now) in step 1313. Subsequently, the first device returns back to step 1301 to initialize the number of received synchronization signals (or the number of detected synchronization signals). In other words, the first device sets the number of received synchronization signals (or the number of detected synchronization signals), to zero (0).

The first device updates a value of the coupling factor $\epsilon$ using the above-described Equation (3).

In other words, referring to FIG. 13, after transmitting a synchronization signal, the first device updates a value of the coupling factor $\epsilon$ depending on the current value of $N_{firings}$ in accordance with $\epsilon=\epsilon_{min}+(\epsilon_{max}-\epsilon_{min})/(N_{firings}+1)$. The process of updating a value of $N_{firings}$ may be clearly understood from the following description made with reference to FIG.

14. Thereafter, the first device detects a synchronization signal(s) transmitted from other device(s), and adjusts its phase value using $g(\Phi)=f^{-1}(f(\Phi(t))+\epsilon)$ in Equation (5).

Figure 14:
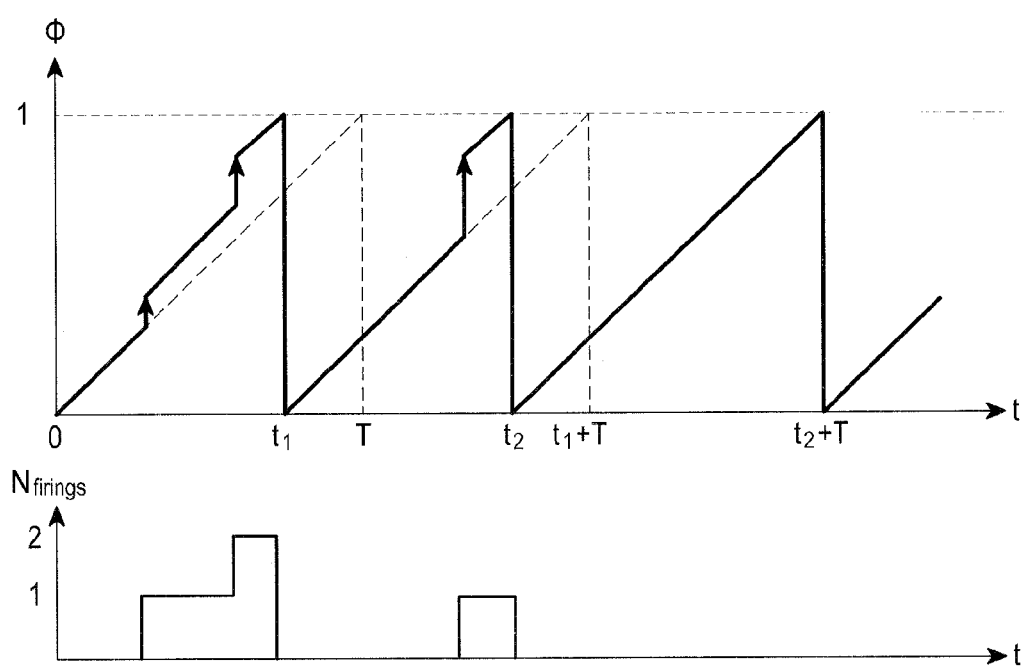
FIG. 14 illustrates changes in a phase value and the number of received synchronization signals, which are determined depending on a synchronization process of a D2D network according to an exemplary embodiment of the present invention.

FIG. 14 illustrates changes in a phase value and the number of received synchronization signals (or the number of detected synchronization signals), which are determined depending on a synchronization process of a D2D network according to an exemplary embodiment of the present invention. The process of updating $N_{firings}$ may be understood from the operation described with reference to FIG. 13.

Referring to FIG. 14, although a first device is originally scheduled to perform firing at time with t=T, beginning from time with t=0, $N_{firings}$ increases to '1' when a first synchronization signal is received, and increases to '2' when a second synchronization signal is received, as the first device receives two synchronization signals. At time t1, the phase reaches the maximum value of '1' and the first device transmits a synchronization signal (or performs firing). After updating a value of the coupling factor $\epsilon$ for $N_{firings}=2$ as in step 1311, the first device initializes $N_{firings}$ (or sets $N_{firings}$ to zero (0)). One synchronization signal is received in a period between time $t_1$ and time $t_2$, so $N_{firings}$ increases to 1. In this situation, the first device transmits a synchronization signal, and updates a value of the coupling factor $\epsilon$ for $N_{firings}=1$. Thereafter, the first device initializes $N_{firings}$ (or sets it to zero (0)). In a period between time $t_2$ and time ($t_2$+T), since no synchronization signal is transmitted, the first device updates a value of the coupling factor $\epsilon$ to a value of the coupling factor for $N_{firings}=1$, i.e., to the maximum value $\epsilon_{max}$ of the coupling factor $\epsilon$.

In addition, for a frame structure that uses a plurality of synchronization signals, each device may apply a rule of updating an appropriate value of the coupling factors depending on the status. For example, even in the frame structure using a plurality of synchronization signals, if the synchronization is stable, the device may perform PCO synchronization only for a predetermined synchronization signal pair, taking good advantage of an exemplary embodiment of the present invention.

However, in the frame structure using a plurality of synchronization signals, a device belonging to a specific synchronization signal group has a role in detecting the other synchronization signals. If the synchronization is unstable, the device belonging to each synchronization signal group may need to detect the other synchronization signals. In this case, the first device may operate as in FIG. 15.

Figure 15:
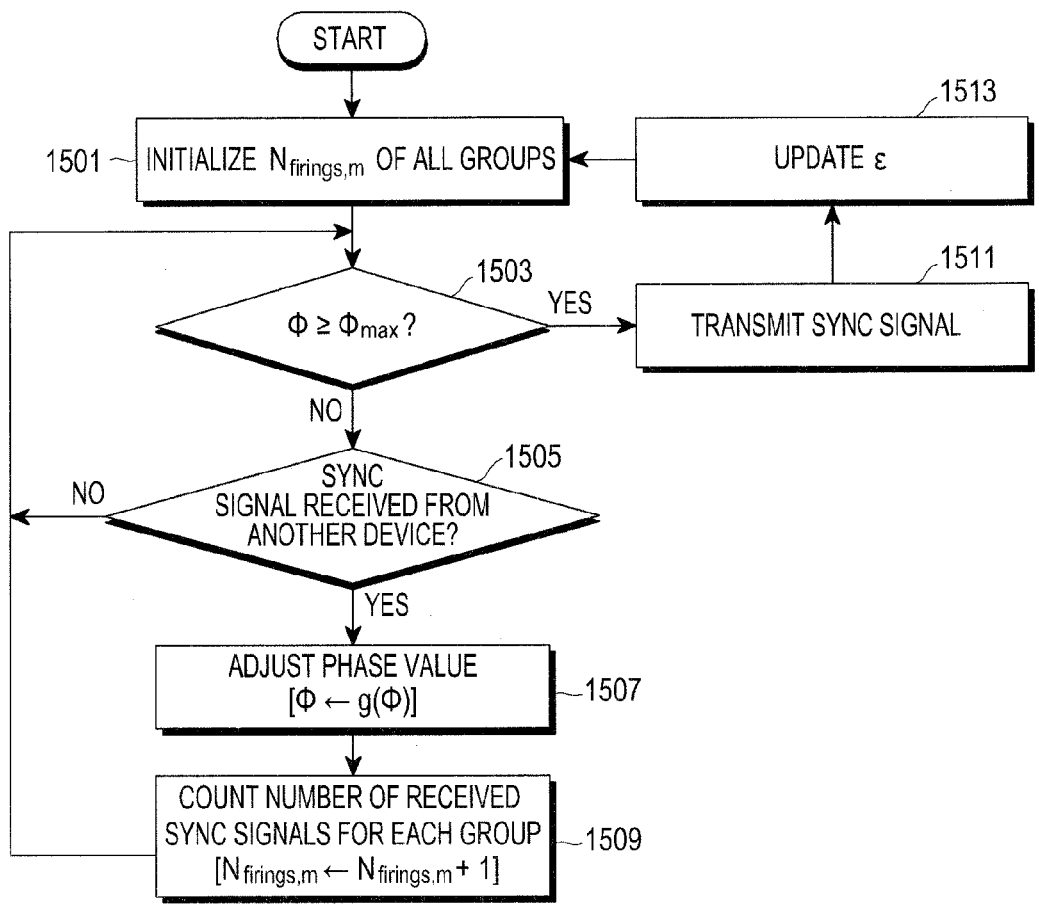
FIG. 15 illustrates a synchronization process in a D2D network according to an exemplary embodiment of the present invention.

FIG. 15 illustrates a synchronization process in a D2D network according to an exemplary embodiment of the present invention. Referring to FIG. 15, a first device performs synchronization in a synchronization process similar to that in FIG. 13. However, just in case second to fourth devices are in different synchronization signal groups though they have the same phase value, the first device may count the number of detected synchronization signals for each group in step 1509, and store the number as a separate variable. In other words in step 1509, the first device counts the number of detected synchronization signals on a group-by-group basis.

Specifically, referring to FIG. 15, the first device initializes the number of received synchronization signals for each group (or the number of detected synchronization signals) in step 1501, and determines in step 1503 whether the current phase value is greater than or equal to its maximum value. If the current phase value is less than the maximum phase value, the first device proceeds to step 1505. On the contrary, if the current phase value is greater than or equal to the maximum phase value, the first device transmits a synchronization signal in step 1511.

In step 1505, the first device determines whether a synchronization signal is detected from at least one other device. Upon detecting a synchronization signal transmitted from at least one other device, the first device proceeds to step 1507. However, upon failure to detect a synchronization signal transmitted from at least one other device, the first device returns to step 1503.

In step 1507, the first device adjusts its phase value using Equation (5), upon detecting the transmission by another device. Subsequently, in step 1509, the first device counts the number of detected synchronization signals on a group-by-group basis, and then returns back to step 1503.

If the adjusted phase value at step 1507 is greater than or equal to the maximum phase value in step 1503, the first device transmits a synchronization signal in step 1511, so the phase value is initialized back to its original value of zero (0). After transmitting the synchronization signal, the first device determines or updates a value of the coupling factor $\epsilon$ depending on the number $N_{firings}$ of synchronization signals received up to now in step 1513, and then returns back to step 1501 to initialize or set the number of received synchronization signals to zero (0).

The first device updates a value of the coupling factor $\epsilon$ using above-described Equation (4).

In other words, after transmitting the synchronization signal, the first device updates a value of the coupling factor $\epsilon$ in accordance with $$\varepsilon = \varepsilon_{min} + (\varepsilon_{max} - \varepsilon_{min}) \Big/ \max_{m \in M}\{(N_{firings,m}+1)\},$$

detects transmission of a synchronization signal by another device, and adjusts its phase value using $g(\Phi)=f^{-}(f(\Phi(t))+\epsilon)$ in Equation (5).

Although Equation (3) and Equation (4) are used by way of example in the foregoing description of FIGS. 13 and 15, the following Table 1 defining a relationship between the number of received synchronization signals (or the number of detected synchronization signals) and a value of the coupling factor $\epsilon$ may be used depending on the implementation. It will be apparent to those of ordinary skill in the art that any other methods may be used as long as they can represent a relationship between the number of received synchronization signals (or the number of detected synchronization signals) and a value of the coupling factor $\epsilon$.

TABLE 1

| Number of received sync signals | Coupling factor $\epsilon$ |
|---|---|
| 0 | $\epsilon_{max}$ |
| 1~3 | $\epsilon_3$ |
| 4~10 | $\epsilon_2$ |
| 11~20 | $\epsilon_1$ |
| 21~ | $\epsilon_{min}$ |

Although the number of received synchronization signals, which have been counted during a previous period, is used by way of example in the foregoing description of FIGS. 13 and 15, various other values such as the simple average, weighted average, minimum value and maximum value of the number of received synchronization signals, which have been counted over several previous periods, may be used taking into account the uncertainty of receiving or detecting synchronization signals.

Figure 16:
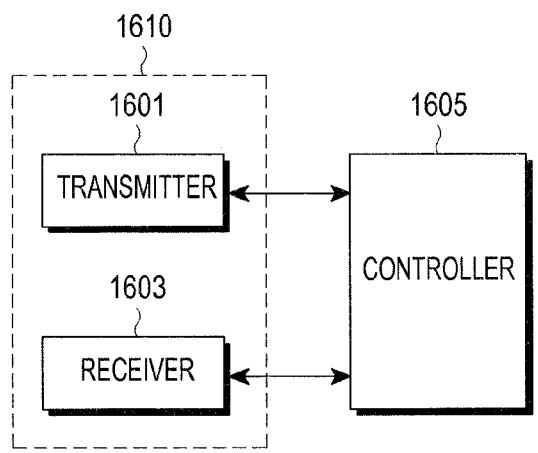
FIG. 16 illustrates a synchronization apparatus in a D2D network according to an exemplary embodiment of the present invention.

FIG. 16 illustrates a synchronization apparatus in a D2D network according to an exemplary embodiment of the present invention. The synchronization apparatus illustrated in FIG. 16 may be included in one device.

Referring to FIG. 16, the synchronization apparatus includes a transmitter 1601, a receiver 1603 and a controller 1605. The transmitter 1601 and the receiver 1603 may be configured as a single unit 1610.

The transmitter 1601, under control of the controller 1605, transmits a synchronization signal if the current phase value is greater than or equal to its maximum value. The receiver 1603 detects a synchronization signal received from at least one other device.

If the current phase value is greater than or equal to the maximum value, the controller 1605 controls the transmitter 1601 to transmit a synchronization signal, and determines whether a synchronization signal is received from at least one other device, by way of the receiver 1603. Upon detecting a synchronization signal received from the at least one other device, the controller 1605 readjusts the phase value using a value of the coupling factor $\epsilon$, which was measured in a previous period like in Equation (5), and counts the number of detected synchronization signals received from the at least one other device for each device or for each group. Based on the count results, the controller 1605 determines a value of the coupling factor $\epsilon$ using Equation (3) or Equation (4).

As is apparent from the foregoing description, aspects of the present invention may update a value of the coupling factor $\epsilon$ depending on the situations of nearby devices, for a D2D network, which makes it possible to adjust the convergence speed, thereby ensuring fast synchronization.

The proposed boosting method of adjusting the convergence speed depending on the circumstances, for a D2D network, may ensure fast synchronization. The boosting method may be consistently operated even when a frame structure using multiple types of synchronization signals is considered for robust synchronization.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing synchronization by a first device in a device-to-device (D2D) network, the method comprising:
    detecting a synchronization signal from at least one second device during one period;
    updating a coupling value based on a number of synchronization signals, which have been detected from the at least one second device during the one period;
    adjusting a phase value based on the coupling value; and
    transmitting a synchronization signal if the phase value reaches a predetermined value.

2. The method of claim 1, wherein the coupling value is updated by increasing a related value by a predetermined value if the number of synchronization signals is decreased by a predetermined range compared to a number of synchronization signals which is previously detected, or decreasing a related value by a predetermined value if the number of synchronization signals is increased by a predetermined range compared to a number of synchronization signals which is previously detected.

3. The method of claim 1, wherein the one period continues from a point of time that the first device transmitted a previous synchronization signal, until the first device transmits a current synchronization signal.

4. The method of claim 3, wherein the one period varies based on a number of synchronization signals, which have been detected from the at least one second device beginning from the point of time that the first device transmitted the previous synchronization signal, until the first device transmits the current synchronization signal.

5. The method of claim 1, wherein the coupling value includes a coupling factor used to adjust a phase of a pulse-coupled oscillator (PCO).

6. The method of claim 5, wherein the coupling factor is determined within a predetermined range between a minimum value and a maximum value, in inverse proportion to the number of synchronization signals.

7. The method of claim 6, further comprising counting the number of synchronization signals each time the first device detects a synchronization signal transmitted from another device.

8. The method of claim 7, wherein the coupling factor is determined in accordance with the following equation;

$$\epsilon = \epsilon_{min} + (\epsilon_{max} - \epsilon_{min})/(N_{firings}+1)$$

where $\epsilon$ denotes the coupling factor, $\epsilon_{min}$ denotes the minimum possible value of the coupling factor, $\epsilon_{max}$ denotes the maximum possible value of the coupling factor, and $N_{firings}$ denotes the number of synchronization signals.

9. The method of claim 6, further comprising counting the number of synchronization signals each time the first device detects a synchronization signal that is transmitted from other groups each including a plurality of devices that transmit a synchronization signal having the same timing.

10. The method of claim 9, wherein the coupling factor is determined in accordance with the following equation;

$$\varepsilon = \varepsilon_{min} + (\varepsilon_{max} - \varepsilon_{min}) \Big/ \max_{m \in M}\{(N_{firings,m} + 1)\}$$

where $\epsilon$ denotes the coupling factor, $\epsilon_{min}$ denotes the minimum possible value of the coupling factor, $\epsilon_{max}$ denotes the maximum possible value of the coupling factor, $N_{firings,m}$ denotes the number of synchronization signals for an m-th group, and M denotes the number of groups.

11. The method of claim 1, wherein the phase value is determined in accordance with the following equation;

$$g(\Phi) = f^{-1}(f(t)) + \epsilon)$$

where $g(\Phi)$ denotes the phase value, $\epsilon$ denotes the coupling value, $f$ denotes a predetermined function, and $\Phi(t)$ denotes a phase value when the first device detects a synchronization signal.

12. An apparatus for performing synchronization by a first device in a device-to-device (D2D) network, the apparatus comprising:
    a receiver configured to detect a synchronization signal from at least one second device during one period; and
    a controller processor configured to:
        update a coupling value for adjusting a phase based on a number of synchronization signals, which have been detected from the at least one second device during the one period,
        adjust a phase value based on the coupling value, and
        control a transmitter to transmit a synchronization signal if the phase value reaches a predetermined value.

13. The apparatus of claim 12, wherein the coupling value is updated by increasing a related value by a predetermined value if the number of synchronization signals is decreased by a predetermined range compared to a number of synchronization signals which is previously detected, or decreasing a related value by a predetermined value if the number of synchronization signals is increased by a predetermined range compared to a number of synchronization signals which is previously detected.

14. The apparatus of claim 12, wherein the one period continues from a point of time that the first device transmitted a previous synchronization signal, until the first device transmits a current synchronization signal.

15. The apparatus of claim 14, wherein the one period varies based on a number of synchronization signals, which have been detected from the at least one second device beginning from the point of time that the first device transmitted the previous synchronization signal, until the first device transmits the current synchronization signal.

16. The apparatus of claim 12, wherein the coupling value includes a coupling factor used to adjust a phase of a pulse-coupled oscillator (PCO).

17. The apparatus of claim 16, wherein the coupling factor is determined within a predetermined range between a minimum value and a maximum value, in inverse proportion to the number of synchronization signals.

18. The apparatus of claim 17, wherein the controller processor counts the number of detected synchronization signals each time the first device detects a synchronization signal transmitted from another device.

19. The apparatus of claim 18, wherein the coupling factor is determined in accordance with the following equation;

$$\epsilon = \epsilon_{min} + (\epsilon_{max} - \epsilon_{min})/(N_{firings} + 1)$$

where $\epsilon$ denotes the coupling factor, $\epsilon_{min}$ denotes the minimum possible value of the coupling factor, $\epsilon_{max}$ denotes the maximum possible value of the coupling factor, and $N_{firings}$ denotes the number of synchronization signals.

20. The apparatus of claim 17, wherein the controller processor counts the number of synchronization signals each time the first device detects a synchronization signal that is transmitted from other groups each including a plurality of devices that transmit a synchronization signal having the same timing.

21. The apparatus of claim 20, wherein the coupling factor is determined in accordance with the following equation;

$$\varepsilon = \varepsilon_{min} + (\varepsilon_{max} - \varepsilon_{min})/\max_{m \in M}\{(N_{firings,m} + 1)\}$$

where $\epsilon$ denotes the coupling factor, $\epsilon_{min}$ denotes the minimum possible value of the coupling factor, $\epsilon_{max}$ denotes the maximum possible value of the coupling factor, $N_{firings,m}$ denotes the number of synchronization signals for an m-th group, and M denotes the number of groups.

22. The apparatus of claim 12, wherein the phase value of the first device is determined in accordance with the following equation;

$$g(\Phi) = f^{-1}(f(\Phi(t)) + \epsilon)$$

where $g(\Phi)$ denotes the phase value, $\epsilon$ denotes the coupling value, f denotes a predetermined function, and $\Phi(t)$ denotes a phase value when the first device detects the synchronization signal.

23. The method of claim 1, wherein the coupling value includes a coupling factor used to adjust a phase of an oscillator, and
wherein the coupling factor is determined based on at least one of a minimum possible value of the coupling factor, a maximum possible value of the coupling factor, and the number of synchronization signals.

24. The apparatus of claim 12, wherein the coupling value includes a coupling factor used to adjust a phase of an oscillator, and
wherein the coupling factor is determined based on at least one of a minimum possible value of the coupling factor, a maximum possible value of the coupling factor, and the number of synchronization signals.

* * * * *